(12) United States Patent
Hoover

(10) Patent No.: US 8,411,329 B2
(45) Date of Patent: Apr. 2, 2013

(54) DUAL OPTICAL PATH IMAGE SCANNER FOR AUTOMATIC IMAGE QUALITY MEASUREMENTS IN AN IMAGE PRODUCTION DEVICE

(75) Inventor: Martin Edward Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 859 days.

(21) Appl. No.: 12/542,854

(22) Filed: Aug. 18, 2009

(65) Prior Publication Data

US 2011/0043866 A1    Feb. 24, 2011

(51) Int. Cl.
*H04N 1/00* (2006.01)
*H04N 1/04* (2006.01)
*H04N 1/46* (2006.01)

(52) U.S. Cl. .................. 358/406; 358/497; 358/504

(58) Field of Classification Search .................. None
See application file for complete search history.

(56) References Cited

U.S. PATENT DOCUMENTS

| | | | |
|---|---|---|---|
| 5,884,118 A | 3/1999 | Mestha et al. | |
| 6,757,084 B2* | 6/2004 | Kurita et al. | 358/509 |
| 2001/0012134 A1* | 8/2001 | Han | 358/487 |
| 2002/0176634 A1* | 11/2002 | Ohashi | 382/275 |
| 2003/0076523 A1* | 4/2003 | Ito et al. | 358/1.14 |
| 2004/0021914 A1* | 2/2004 | Imaizumi | 358/475 |
| 2004/0141209 A1* | 7/2004 | Marumoto et al. | 358/3.26 |

OTHER PUBLICATIONS

Stan A. Spencer; "Dual Mode Printer Output Spectrophotometer and Input Document Scanning System"; U.S. Appl. No. 11/158,149, filed Jun. 21, 2005.

* cited by examiner

*Primary Examiner* — Ming Hon
(74) *Attorney, Agent, or Firm* — Ronald E. Prass, Jr.; PRASS LLP

(57) ABSTRACT

A method for automatically measuring image quality using a dual optical path image scanner an image production device is disclosed. The method may include receiving a signal to measure image quality, moving a flip-mirror into an optical path of the image scanner, initiating scanning and printing of a test image for measuring image quality, outputting the test image, and measuring image quality based on the output test image.

18 Claims, 4 Drawing Sheets

DUAL OPTICAL PATH IMAGE SCANNER FOR AUTOMATIC IMAGE QUALITY MEASUREMENTS IN AN IMAGE PRODUCTION DEVICE

BACKGROUND

Disclosed herein is a dual optical path image scanner for automatic image quality measurements in an image production device, as well as the corresponding apparatus and computer-readable medium.

Producing prints with high image quality using digital and multifunction image production devices often requires measurement and setup of device settings and print quality control systems to mitigate image quality defects. Diagnostics and service of these machines also often requires measurement of test prints to diagnose problems or verify image quality has been restored after service. Currently image quality setups based on using scanning of test prints are manually assisted by operator scanning prints with the product scanner included on top of the digital device. In other cases, service tools are implemented using offline scanner separate from the machine. In still other cases, a dedicated sensor is included in the device to scan images on photoreceptor, imaging drum, or on test prints with an integrated image sensor.

SUMMARY

A method for automatically measuring image quality using a dual optical path image scanner an image production device is disclosed. The method may include receiving a signal to measure image quality, moving a flip-mirror into an optical path of the image scanner, initiating scanning and printing of a test image for measuring image quality, outputting the test image, and measuring image quality based on the output test image.

DETAILED DESCRIPTION

Figure 1:
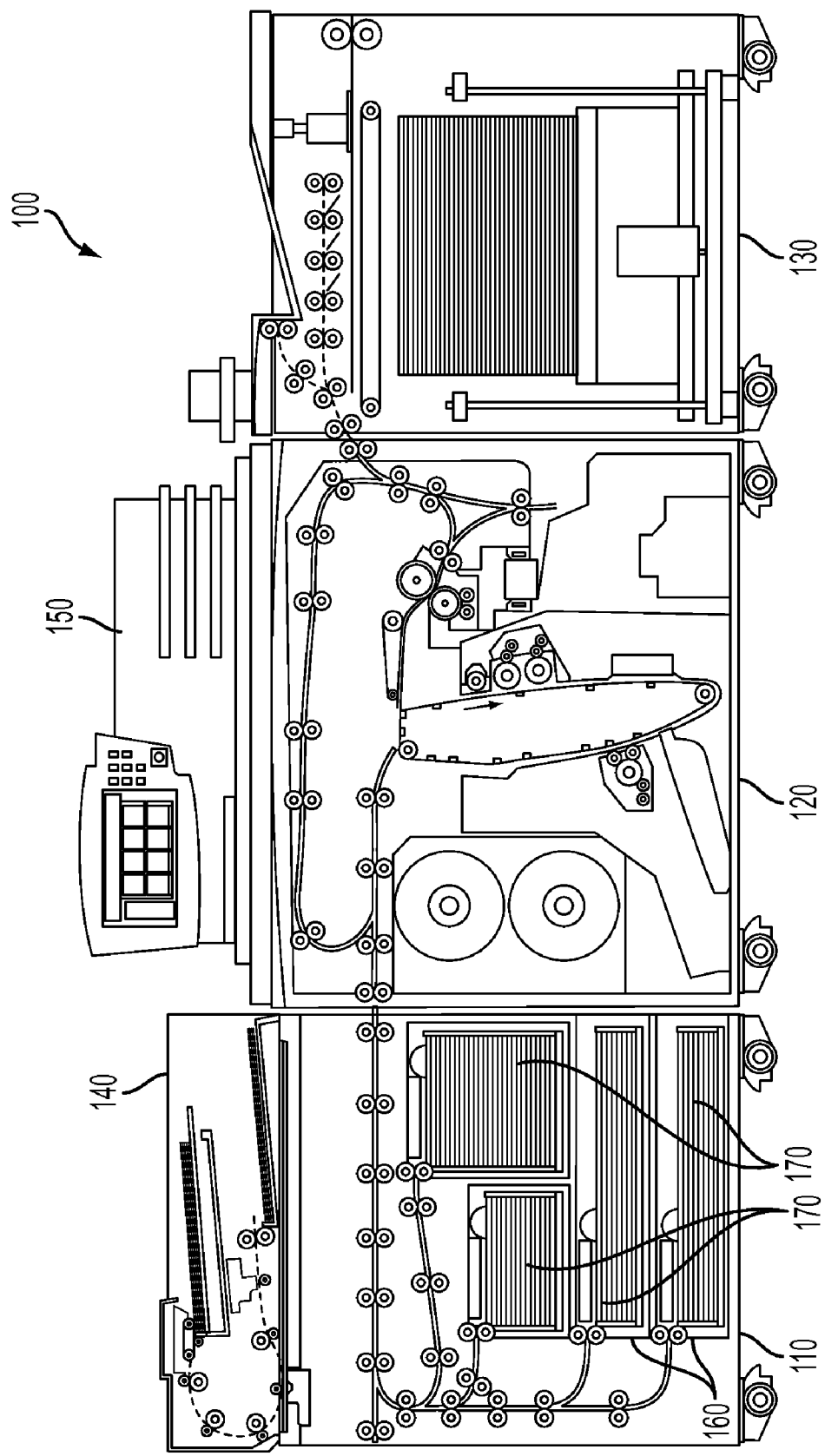
FIG. 1 is an exemplary diagram of an image production device in accordance with one possible embodiment of the disclosure.

Aspects of the embodiments disclosed herein relate to a method for determining media thickness in a feeder section of an image production device, as well as corresponding apparatus and computer-readable medium.

The disclosed embodiments may include a method for automatically measuring image quality using a dual optical path image scanner an image production device is disclosed. The method may include receiving a signal to measure image quality, moving a flip-mirror into an optical path of the image scanner, initiating scanning and printing of a test image for measuring image quality, outputting the test image, and measuring image quality based on the output test image.

The disclosed embodiments may further include an image production device having an image scanner that scans documents into images, a flip mirror that is located in the optical path of the image scanner, and an image quality measurement unit that receives a signal to measure image quality, moves the flip-mirror into the optical path of the image scanner, initiates scanning and printing of a test image by the scanner for measuring image quality, outputs the test image, and measures image quality based on the output test image.

The disclosed embodiments may further include a computer-readable medium storing instructions for controlling a computing device for automatically measuring image quality using a dual optical path image scanner an image production device. The instructions may include receiving a signal to measure image quality, moving a flip-mirror into an optical path of the image scanner, initiating scanning and printing of a test image for measuring image quality, outputting the test image, and measuring image quality based on the output test image.

The disclosed embodiments may concern automatically measuring image quality using a dual optical path image scanner an image production device. This process may include using a dual optical path built into the product scanner to enable the image sensor in the scanner to be used for both scanning customer originals (copier/scanner) and also measurement of print quality being produced by the printing process. The scanner may include a selectable flip mirror to either use the primary optical path of document scanning or the internal image sensing path to measure test prints in the paper path or on image bearing surfaces such as photoreceptor belt or imaging drum. Optical path of reduction optics scanner image sensing (line scan camera module) may be relatively long distances that involve fold mirrors. Adding a dual position movement to one of the fold mirrors and an optical path slot (air space) may enable scanning a moving object in the printing system—in particular test prints being transported in media path under scanner.

In one position of the flip mirror, "A", the mirror may be out of the optical path entirely and the design functions as a flatbed document scanner. This type of scanner may be a common full-rate half-rate carriage design as is seen in many products by many manufacturers and can be made with high resolution (600 dpi or greater) at low cost.

To be used for the second purpose the flip mirror may be rotated into the scanner's optical path. With the mirror in position "B" (shown in dotted lines), the mirror may redirect the image path down toward the inside the printer image quality measurement location. This may involve test prints being transported toward output in the media path, toned image on belt, ink image on drum, etc. The high-resolution scanner optics may then be used to measure image quality more automatically without operator assistance in handling the test prints and scanning them on the image scanner.

The optical designs of common scanners may be amenable to dual function architectures. The distance from a Charge-Coupled Detector (CCD) array sensor and lens subassembly to the document may be typically 350 mm to 600 mm. That space may be used by the moving carriages but it would be easy to reconfigure it into many different designs known to those of ordinary skill in the art.

By far the most expensive parts of any scanner may be the CCD array board and the subassembly lens. This dual use structure and process may share those expensive components with no sacrifice of quality to either the customer scanning or the image quality sensing function.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a stand-alone feeder section 110, which stores and dispenses sheets on which images are to be printed, and an output section 130, which may include hardware for stacking, folding, stapling, binding, etc., prints which are output from the marking engine. If the printer is also operable as a copier, the printer further includes a document feeder 140, which operates to convert signals from light reflected from original hardcopy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the module includes any number of trays 160, each of which stores a media stack 170 or print sheets ("media") of a predetermined type (size, weight, color, coating, transparency, etc.) and includes a feeder to dispense one of the sheets therein as instructed. Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. Certain types of coated media are advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, etc., with other media sheets in manners familiar in the art.

Figure 2:
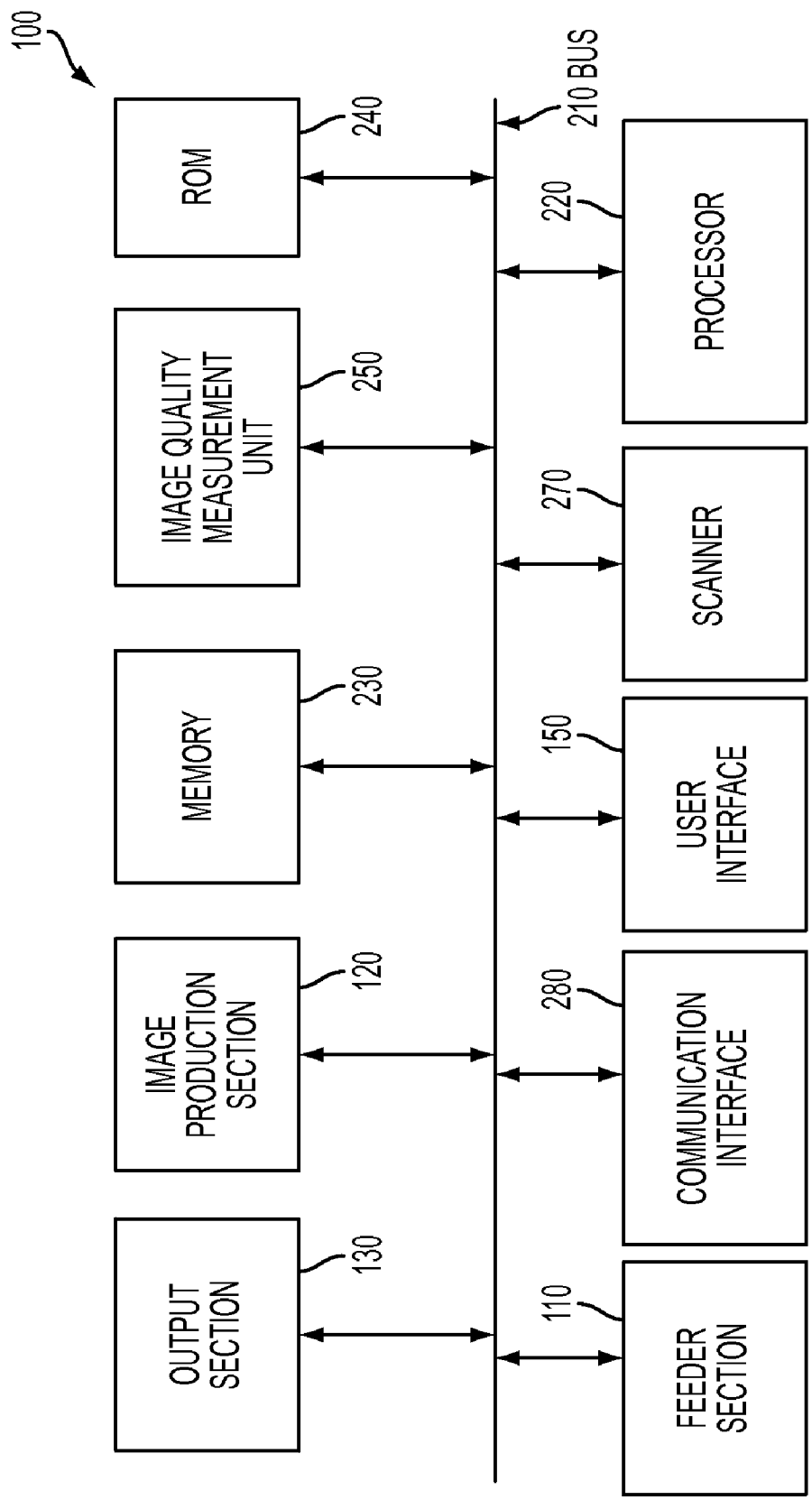
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, an image quality measurement unit 250, a feeder section 110, an output section 130, a user interface 150, a communication interface 280, an image production section 120, and a scanner 270. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 150 may include one or more conventional mechanisms that permit a user to input information to and interact with the image production unit 100, such as a keyboard, a display, a mouse, a pen, a voice recognition device, touchpad, buttons, etc., for example. Output section 130 may include one or more conventional mechanisms that output image production documents to the user, including output trays, output paths, finishing section, etc., for example. The image production section 120 may include an image printing and/or copying section, a scanner, a fuser, etc., for example.

The scanner 270 (or image scanner) may be any scanner known to one of skill in the art, such as a flat-bed scanner, document feeder scanner, etc. The image scanner 270 may be a common full-rate half-rate carriage design and can be made with high resolution (600 dpi or greater) at low cost, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Figure 3:
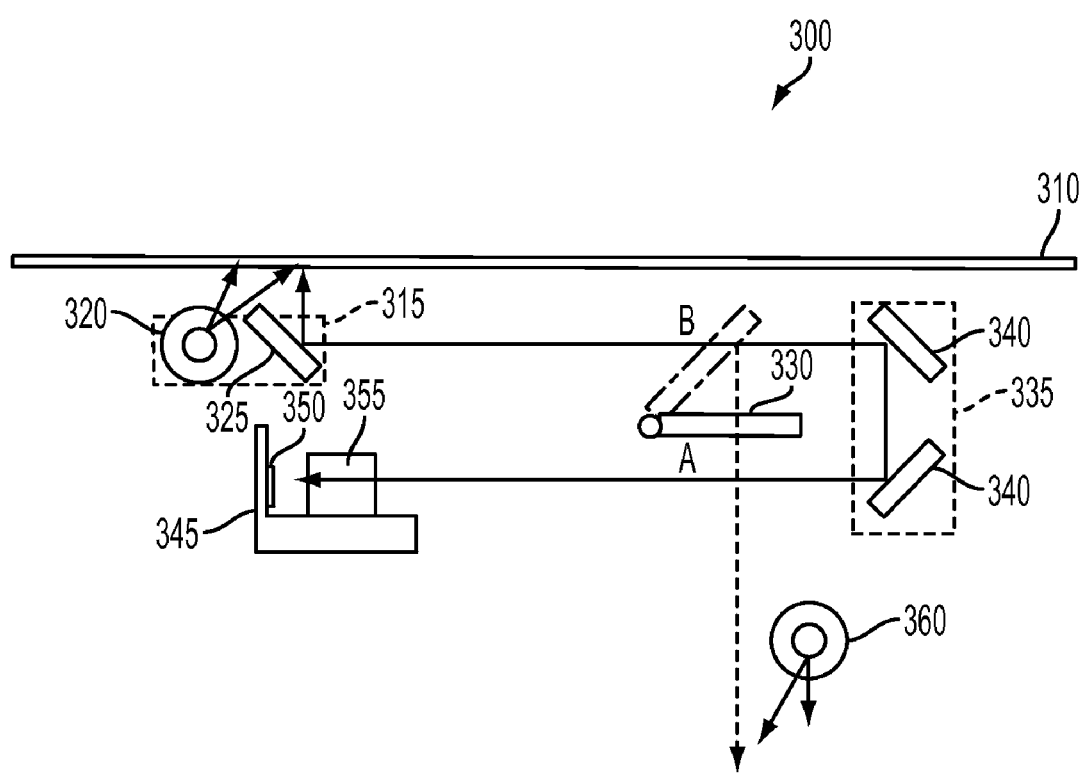
FIG. 3 is an exemplary block diagram of the image quality measurement environment in accordance with one possible embodiment of the disclosure.

FIG. 3 is a diagram of an exemplary image quality measurement environment 300 in accordance with one possible embodiment of the disclosure. The exemplary image quality measurement environment 300 may include platen glass 310, full-rate carriage 315, a first fold mirror 325, an illuminator 320, a second fold mirror 325, a flip-mirror 330, a half-rate carriage 335, a third fold mirror 340, a CCD array and lens subassembly platform 345, a CCD array sensor 350, a lens subassembly 355, and an in-printer illuminator 360.

In one position of the flip-mirror 330, "A", the flip-mirror 330 may be out of the optical path entirely and the design functions as the image scanner 270. This type of scanner 270 may be a common full-rate half-rate carriage 315 design (including the first fold mirror 325 and the illuminator 320) design as is known to one of skill in the art and can be made with high resolution (600 dpi or greater) at low cost. Thus, the image quality measurement unit 250 may move the flip-mirror 330 to the flat position "A" when scanning input documents and not measuring image quality.

To be used for the second purpose the flip mirror may be rotated into the scanner's 270 optical path. For example, the image quality measurement unit 250 may move the flip-mirror 330 to position "B" at an angle between 35°-55° from parallel to the optical path when scanning to measure image quality. With the mirror in position "B" (shown in dotted lines), the flip-mirror 330 may redirect the image path down toward the inside the printer image quality measurement location. This process may involve test prints being transported toward output in the media path, toned image on belt, ink image on drum etc. The high-resolution scanner optics may then be used to measure image quality more automatically without operator assistance in handling the test prints and scanning them on the image scanner 270.

The optical designs of scanners 270 may be amenable to dual function architectures. The distance from a Charge-Coupled Detector (CCD) array sensor 350 and lens subassembly 355 to the document may be typically 350 mm to 600 mm. That space may be used by the moving carriages 315, 355 but it would be easy to reconfigure it into many different designs.

The operation of components of the image quality measurement unit 250 and the image quality measurement process will be discussed in relation to the flowchart in FIG. 4.

Figure 4:
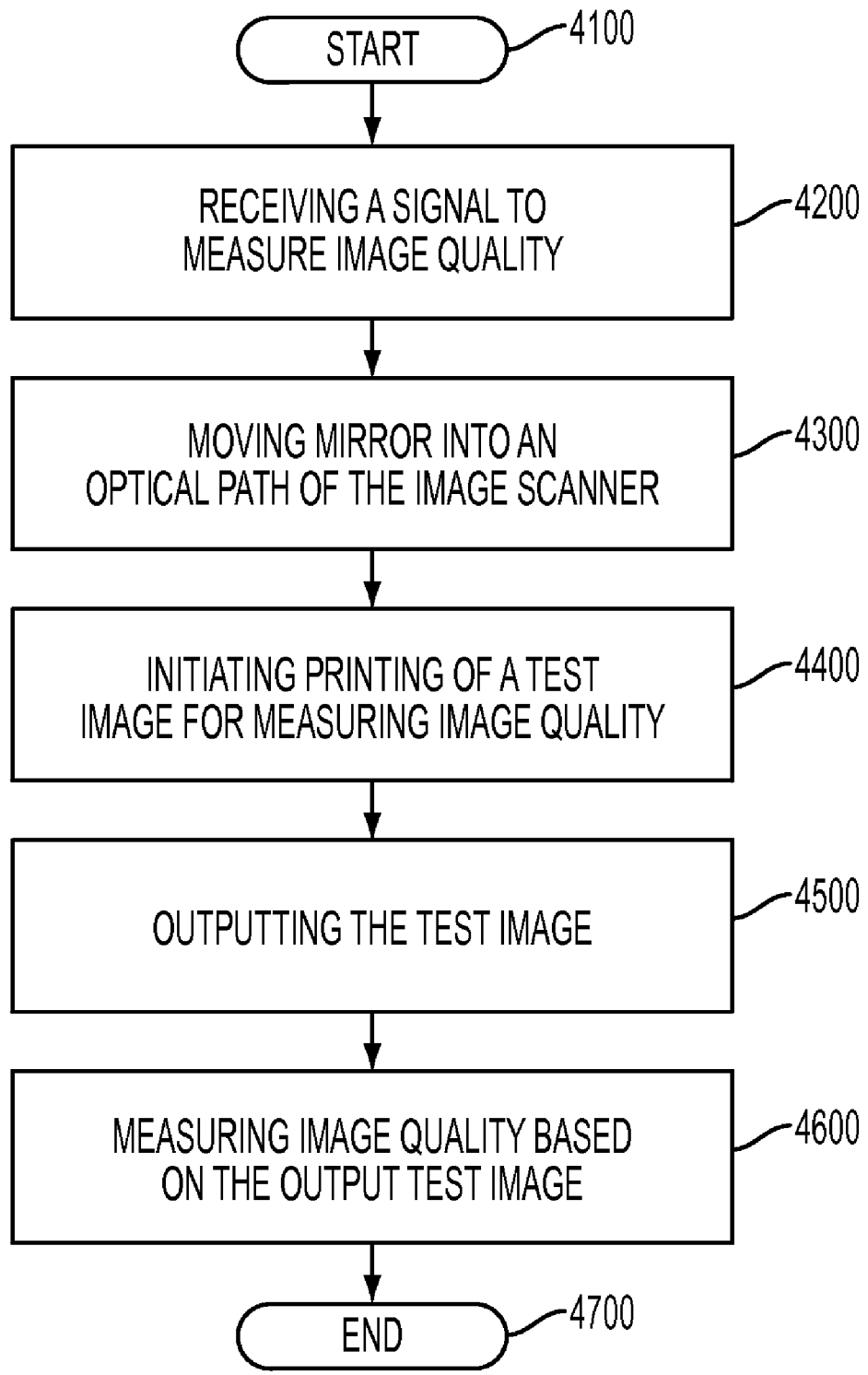
FIG. 4 is a flowchart of an exemplary image quality measurement process in accordance with one possible embodiment of the disclosure.

FIG. 4 is a flowchart of an image quality measurement process in accordance with one possible embodiment of the disclosure. The method begins at 4100, and continues to 4200 where the image quality measurement unit 250 may receive a signal to measure image quality. The image quality measurement unit 250 may receive the signal to measure image quality from the user interface 150, for example. At step 4300, the image quality measurement unit 250 may move a mirror into an optical path of the image scanner 270.

At step 4400, the image quality measurement unit 250 may initiate scanning and printing of a test image for measuring image quality. At step 4500, the image quality measurement unit 250 may output the test image. At step 4600, the image quality measurement unit 250 may measure image quality based on the output test image. The process may then go to step 4800 and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for automatically measuring image quality using a dual optical path image scanner in an image production device, comprising:
   receiving a signal to measure image quality;
   moving a flip-mirror into an optical path of the dual optical path image scanner to redirect an image path toward an image quality measurement location;
   initiating scanning and printing of a test image for measuring image quality;
   outputting the test image; and
   automatically measuring image quality based on the output test image,
   wherein the flip mirror is moved to a flat position when scanning input documents and not measuring image quality.

2. The method of claim 1, wherein scanning is performed using high-resolution scanning optics.

3. The method of claim 1, wherein scanning is perform using one of a flat-bed scanner and a document feeder scanner.

4. The method of claim 1, wherein the flip mirror is moved to an angle between 35°-55° from parallel to the optical path when scanning to measure image quality.

5. The method of claim 1, wherein the signal to measure image quality is received from the image production device's user interface.

6. The method of claim 1, wherein the image production device is one of a copier, a printer, a facsimile device, and a multi-function device.

7. An image production device that automatically measures image quality, comprising:
   a dual optical path image scanner that scans documents into images;
   a flip mirror that is located in the optical path of the dual optical path image scanner; and
   an image quality measurement unit that receives a signal to measure image quality, moves the flip-mirror into an optical path of the dual optical path image scanner to redirect an image path toward an image quality measurement location, initiates scanning and printing of a test image by the dual optical path image scanner for measuring image quality, outputs the test image, and automatically measures image quality based on the output test image,
   wherein the flip mirror is moved to a flat position when scanning input documents and not measuring image quality.

8. The image production device of claim 7, wherein the dual optical path image scanner performs scanning using high-resolution scanning optics.

9. The image production device of claim 7, wherein the dual optical path image scanner is one of a flat-bed scanner and a document feeder scanner.

10. The image production device of claim 7, wherein the image quality measurement unit moves the flip mirror to an angle between 35°-55° from parallel to the optical path when scanning to measure image quality.

11. The image production device of claim 7, further comprising:
a user interface that receives commands from a user, wherein the image quality measurement unit receives the signal to measure image quality from the user interface.

12. The image production device of claim 7, wherein the image production device is one of a copier, a printer, a facsimile device, and a multi-function device.

13. A non-transitory computer-readable medium storing instructions for controlling a computing device for automatically measuring image quality using a dual optical path image scanner an image production device, the instructions comprising:
receiving a signal to measure image quality;
moving a flip-mirror into an optical path of the dual optical path image scanner to redirect an image path toward an image quality measurement location;
initiating scanning and printing of a test image for measuring image quality;
outputting the test image; and
automatically measuring image quality based on the output test image,
wherein the flip mirror is moved to a flat position when scanning input documents and not measuring image quality.

14. The non-transitory computer-readable medium of claim 13, wherein scanning is performed using high-resolution scanning optics.

15. The non-transitory computer-readable medium of claim 13, wherein scanning is perform using one of a flat-bed scanner and a document feeder scanner.

16. The non-transitory computer-readable medium of claim 13, wherein the flip mirror is moved to an angle between 35°-55° from parallel to the optical path when scanning to measure image quality.

17. The non-transitory computer-readable medium of claim 13, wherein the signal to measure image quality is received from the image production device's user interface.

18. The non-transitory computer-readable medium of claim 13, wherein the image production device is one of a copier, a printer, a facsimile device, and a multi-function device.

* * * * *